(12) United States Patent
Hill et al.

(10) Patent No.: US 7,011,070 B2
(45) Date of Patent: Mar. 14, 2006

(54) METHOD OF REDUCING PARTICULATES AND ENHANCING BURNING RATE WITHIN A COMBUSTION CHAMBER

(75) Inventors: Philip G. Hill, Vancouver (CA); Dehong Zhang, Vancouver (CA); Guowei Li, Vancouver (CA)

(73) Assignee: Westport Research Inc., Vancouver (CA)

( * ) Notice: Subject to any disclaimer, the term of this patent is extended or adjusted under 35 U.S.C. 154(b) by 0 days.

(21) Appl. No.: 11/098,366

(22) Filed: Apr. 4, 2005

(65) Prior Publication Data
US 2005/0217637 A1 Oct. 6, 2005

Related U.S. Application Data

(63) Continuation of application No. PCT/CA03/01464, filed on Oct. 2, 2003.

(51) Int. Cl.
*F02B 3/08* (2006.01)
(52) U.S. Cl. .................. 123/298; 123/301; 123/305
(58) Field of Classification Search ............ 123/298, 123/301, 305
See application file for complete search history.

(56) References Cited

U.S. PATENT DOCUMENTS

| 4,237,827 A | 12/1980 | Hamai |
| 4,574,754 A | 3/1986 | Rhoades, Jr. |
| 4,635,598 A | 1/1987 | Tanaka et al. |
| 4,662,330 A | 5/1987 | Shioyama et al. |
| 4,779,587 A | 10/1988 | Schweinzer et al. |
| 4,825,843 A | 5/1989 | Novy |
| 4,913,111 A | 4/1990 | Ariga |
| 5,067,457 A | 11/1991 | Shinzawa |
| 5,522,357 A * | 6/1996 | Nogi et al. ............. 123/261 |
| 5,862,788 A | 1/1999 | Pouring et al. |
| 5,970,944 A | 10/1999 | Kawamura |
| 6,651,618 B1 * | 11/2003 | Coleman et al. ............ 123/305 |

FOREIGN PATENT DOCUMENTS

| DE | 562673 | 2/1935 |
| GB | 380337 | 9/1932 |
| JP | 06101479 A | 4/1994 |
| JP | 06193447 A | 7/1994 |
| JP | 07063076 A | 3/1995 |
| JP | 07158448 A | 6/1995 |
| JP | 10089074 | 4/1998 |
| JP | 10121969 A | 5/1998 |
| JP | 2000161066 A | 6/2000 |
| JP | 2000297648 A | 10/2000 |
| JP | 2001050115 A | 2/2001 |
| JP | 2001182538 A | 7/2001 |

* cited by examiner

*Primary Examiner*—Erick Solis
(74) *Attorney, Agent, or Firm*—McAndrews, Held & Malloy, Ltd.

(57) ABSTRACT

A method and apparatus generate turbulence and impact on soot rich zone within a burning fuel jet within a combustion chamber of an internal combustion engine. A reservoir accumulates charge and projects the charge into a combustion chamber and into and around the burning fuel directly injected into the combustion chamber. A ring or the fire deck define one or more reservoirs with an orifice for accumulating, directing and ejecting the charge. The method and apparatus are particularly beneficial when employed with gaseous fuels.

27 Claims, 8 Drawing Sheets

METHOD OF REDUCING PARTICULATES AND ENHANCING BURNING RATE WITHIN A COMBUSTION CHAMBER

CROSS-REFERENCE TO RELATED APPLICATION(S)

This application is a continuation of International Application No. PCT/CA2003/001464, having an international filing date of Oct. 2, 2003, entitled "Method of Reducing Particulates and Enhancing Burning Rate within a Combustion Chamber". International Application No. PCT/CA2003/001464 claimed priority benefits, in turn, from Canadian Patent Application No. 2,406,204 filed Oct. 2, 2002. International Application No. PCT/CA2003/001464 is also hereby incorporated by reference herein in its entirety.

FIELD OF THE INVENTION

The present invention relates to a method and apparatus for creating a combustion event within the combustion chamber of an internal combustion engine, which reduces particulates generated within this combustion chamber.

BACKGROUND OF THE INVENTION

Advantages of high efficiency and high torque at low speed are realized by employing rapid near-top-dead-center injection of fuel jets. Such direct injection creates its own turbulence and burns at a characteristically turbulence-limited combustion rate.

A characteristic disadvantage of the modern conventional diesel engine is the tendency to produce particulate matter, particularly soot, as a result of incomplete oxidation of the fuel. Another tendency is to produce excessive nitrogen oxides (NOx) due to the fact that diffusion. combustion is characteristic of such systems-combustion takes place around the stoichiometric or maximum temperature. It has long been known that measures which tend to reduce the production of nitrogen oxides also tend to increase the production of soot and vice versa. However, if soot production could be inhibited, the production of nitrogen oxides could also be reduced. Moreover, soot reduction should also increase power density.

A related issue that impacts on soot production relates to a strategy used to reduce nitrogen oxides. This strategy is partial re-circulation of exhaust gas (EGR). EGR helps to reduce combustion temperature and, as a result, NOx. The reduction of combustion temperature however impacts the rate of oxidation of soot formed as a combustion intermediate. Further, it has been found that it also tends to reduce burning rate. Such incomplete combustion results in reduced efficiency of the engine overall. Therefore, in light of the fact that soot production and incomplete combustion limit the extent to which exhaust gas re-circulation (EGR) can be utilized, the advantage of a means for increasing the combustion rate and the soot oxidation rate is apparent.

Developments in combustion engine technology have shown that compression ignition engines can be fuelled by gaseous fuels instead of diesel fuel. Some of these developments allow performance and/or efficiency to be maintained with gaseous fuels. Examples of such fuels include natural gas, methane, propane, ethane, gaseous combustible hydrocarbon derivatives and hydrogen. Substituting diesel with such gaseous fuels results in emissions benefits over diesel. Specifically, lower NOx and soot production are found in the exhaust gas created in such engines.

A method used to ensure that gaseous fuels match, for the most part, the performance and efficiency found in diesel-fueled ignition engines, relies on diffusion combustion. That is, gaseous fuel is directly injected at high pressure into a combustion chamber where an ignition source is usually used to ignite the gaseous fuel. Due to such direct injection and diffusion combustion, this fuel generally suffers from the same issues noted above in regards to soot and NOx generation, albeit at significantly lower levels than is the case with diesel fuel. The same zone of incomplete oxidation found in regards to combustion resulting from diesel-fuelled compression ignition strategies is thought to result. As such, while gaseous fuels provide a significant reduction of particulates and NOx, these fuels, directly injected, are governed by some of the same physical processes found in diesel-fuelled compression ignition engines. Therefore, room is available to manage soot and particulate production in both gaseous-fuelled and diesel-fuelled direct injection engines.

Dec, J. E., "A Conceptual Model of DI Diesel Combustion based on Laser-Sheet Imaging", SAE 970873, 1997, provided a physical understanding of conventional diesel fuel combustion for the quasi-steady period of burning. It appears that combustion takes place in two phases. The first occurs in the rich mixture created by entrainment of air into the fuel jet. Here the equivalence ratio is so high that the flame temperature is low (perhaps around 1600° K.) and soot forms by pyrolysis due to the shortage of oxygen. A soot-rich zone is created that is surrounded by a thin, region in which final mixing and any remaining chemical reactions occur. Understanding the behavior of this soot rich zone provides a starting point for reducing the production of soot in the diesel and natural gas engines described above.

Sjoeberg, in "The Rotating Injector as a Tool for Exploring DI Diesel Combustion and Emissions Formation Processes", ISSN1400-1179, 2001, provided a rotating injector that, in effect, caused turbulence that impacted on the soot-rich zone by moving the fuel jet throughout the combustion chamber. Such a strategy, however, is difficult to implement. A rotating injector introduces moving parts to the engine that are susceptible to wear and durability issues.

U.S. Pat. No. 5,862,788 discloses a reaction chamber within the piston head that discharges a mixture of fuel and air towards the center of the piston bowl. Here, the chamber is designed so that fuel is admitted and circulated in the chamber and heated before being directed at a soot cloud thought to form within the piston bowl. The requirement to mix fuel within the chamber limits the effect of the fuel/air reaction products as the soot cloud is tied to the fuel jets. As the piston is, in general, moving away from top dead center during combustion of the fuel, the impact on the soot-rich zone is limited. Further, some fuel needs to be directed into the reaction chamber according to this invention, limiting placement of the orifice leading to the chamber.

The present invention deals with the above noted problems related to directly injected fuels used in internal combustion engines.

SUMMARY OF THE INVENTION

The present invention introduces combustion chamber "charge jets" directed at interfering with directly injected fuels to help reduce the net rate of soot production resulting with directly injected fuels. The charge jets introduced are directed at "breaking up" the soot rich zone found where a directly injected quantity of fuel is injected into a combustion chamber and also to create turbulence to aid in the soot oxidation process.

One aspect of the present invention is to provide a method of reducing soot produced during combustion of a fuel directly injected in a combustion chamber of an operating internal combustion engine. The method includes introducing an intake charge into the combustion chamber during an intake stroke of the piston. Compressing the intake charge during a compression stroke of the piston. Receiving a quantity of the intake charge into a reservoir through an orifice during a compression stroke of the piston and directly injecting and burning a fuel jet of the fuel into the combustion chamber. Turbulence is then generated that interferes with the fuel jet by propelling a charge jet through the orifice into the combustion chamber from the reservoir using a pressure gradient.

In some embodiments of the invention the reservoir is fixed relative to an injector. Also, the charge jet is aimed at a soot rich zone within the fuel jet generated during burning of the fuel.

The charge jet may be directed into or out of the soot rich zone.

The charge jet may increases the $O_{SA}:S_V$ ratio of the burning fuel jet.

Fuel may be injected into the combustion chamber when the piston is near top dead center. Also, the reservoir may be defined by a ring suspended into the combustion chamber. The ring may also be defined within a fire deck where the fire deck partially defines the combustion chamber.

In some embodiments, a ratio of the volume of the reservoir to the volume of the combustion chamber when the piston is at top dead center is between 1:9 and 1:4.

Another aspect of the invention provides an internal combustion engine comprising a cylinder, a piston disposed in the cylinder that is oscillating between top dead center and bottom dead center during operation of the engine and a fire deck. The fire deck, cylinder and piston define a combustion chamber. The engine includes a fuel injector, capable of directly injecting a fuel jet of a fuel into the combustion chamber and at least one reservoir for accumulating a quantity of intake charge during a compression stroke of the piston. At least one orifice is disposed in the reservoir and is in fluid communication with the combustion chamber through the at least one orifice. The at least one orifice has a cross-sectional area capable of restricting flow of the quantity of intake charge from the reservoir into the combustion chamber during the power stroke of the piston.

In some embodiments, the reservoir is fixed in relation to the injector or the reservoir is defined by a ring suspended into the combustion chamber. The ring may be suspended from the fire deck. The ring may be largely centered around the injector.

The reservoir may be defined by at least one post. The post projects into the combustion chamber from the fire deck.

The reservoir may be provided within the fire deck.

In some embodiments a ratio of the volume of the reservoir to the volume of the combustion chamber, when the piston is at top dead center, is between 1:9 and 1:4.

A gaseous fuel may be used as the fuel. The gaseous fuel may comprise natural gas.

A glow plug may be suspended into the combustion chamber to ignite natural gas fuel.

A further aspect of the invention provides a method of generating turbulence with a combustion chamber of an operating internal combustion engine. The method introduces an intake charge into the combustion chamber during an intake stroke of a piston, compresses the intake charge during a compression stroke of the piston, receives a quantity of the intake charge into a reservoir through an orifice during the compression stroke of the piston and directly injects and burns a fuel jet of the fuel within the combustion chamber. Turbulence is then generated within the combustion chamber when the piston is beyond 15 degrees of top dead center by propelling a charge jet through the orifice into the combustion chamber from the reservoir using a pressure gradient.

Further aspects of the invention and features of specific embodiments of the invention are discussed below.

BRIEF DESCRIPTION OF THE DRAWINGS

In Figures which illustrate non-limiting embodiments of the invention:

FIGS. 2a and 2b show a top view and a cross-sectional view of the combustion chamber of a first embodiment of the subject invention wherein charge reservoirs are in communication with the combustion chamber. FIG. 2b shows a cross-sectional view of this embodiment across line A—A shown in FIG. 2a.

FIGS. 3a and 3b are two views of a second embodiment of the subject invention. FIG. 3b shows a cross-sectional view of this embodiment across line B—B shown in FIG. 3a.

FIGS. 4a and 4b are two views of a third embodiment of the subject invention. FIG. 4b shows a cross-sectional view of this embodiment across line C—C shown in FIG. 4a.

DETAILED DESCRIPTION OF PREFERRED EMBODIMENT(S)

In the present invention, a charge reservoir is provided that allows for a pressurized quantity of the intake charge to be captured and then introduced as a "charge jet" into a directly injected fuel jet disrupting the soot rich zone of the fuel. Therefore, when the fuel ignites, the surface area of the soot oxidation zone is increased in relation to the volume of the soot rich zone.

Figure 1:
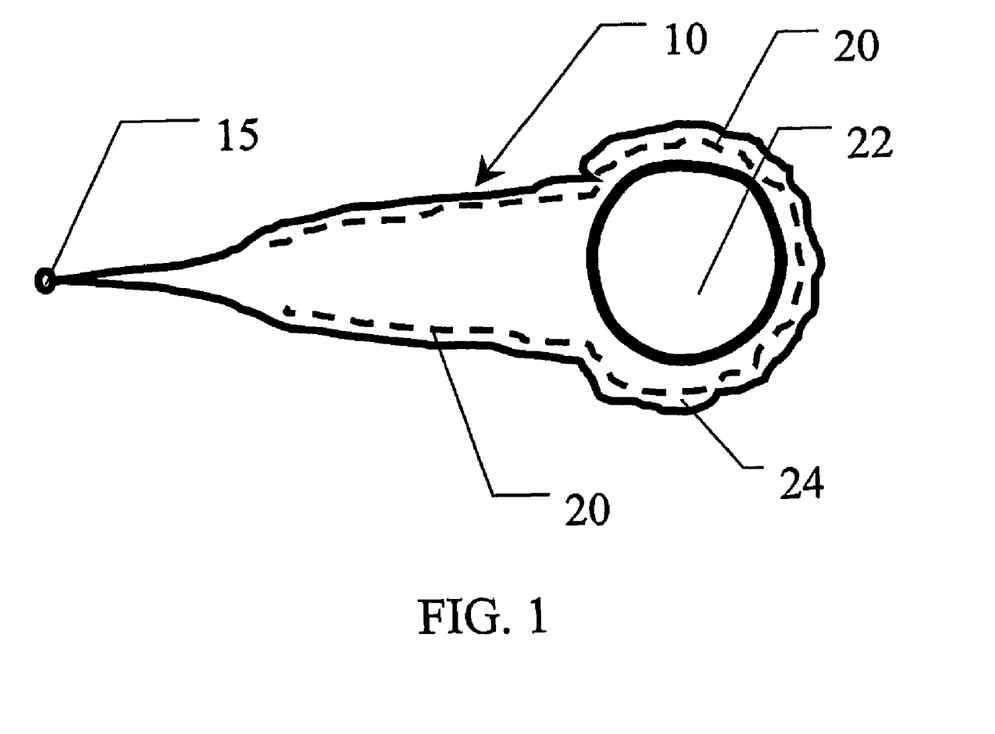
FIG. 1 shows a cross-sectional profile of a directly injected jet of fuel during combustion of the fuel jet that demonstrates the prior art understanding as to how and where soot is accumulated within a fuel jet.

Referring to FIG. 1, the prior art understanding as to how and where soot is accumulated within a fuel jet is shown. Fuel jet 10 is injected through injector hole 15 into an isolated environment. Here the fuel jet has been ignited and is burning after being injected into an environment conducive to the ignition and combustion of the chosen fuel Soot oxidation zone 20 and soot rich zone 22 are shown where combustion zone 24 is partially defined on one side by soot oxidation zone 20.

The ignition and combustion environment is generated, in general, when a charge has been drawn into a combustion chamber and compressed during the compression stroke of the engine Depending on the fuel, some type of ignition assist may be necessary such as a glow plug or pilot fuel or other ignition assist known to persons skilled in the art. Such an ignition assist is generally needed if natural gas is the fuel. In general, this will be referred to as the ignition environment established within the combustion chamber specific to the chosen fuel whether it be assisted or result from the properties of the intake charge alone.

Referring to FIG. 1, during combustion a directly injected jet of fuel will burn in combustion zone 24, which is defined by the boundary layer between fuel jet 10 and the surrounding combustion environment. Interfaced along this zone is a soot oxidation zone 20, which surrounds soot rich zone 22. Soot rich zone 22 is an area of inadequate mixing of fuel and air wherein particulates form. This relatively large zone 22, if deprived of oxygen, will tend to expel the soot created here into the exhaust system. For the purposes of this application, soot includes particulate matter generated in the combustion chamber during combustion of the fuel.

When the charge jet interferes with one or more fuel jets, it breaks up the soot rich zone causing oxygen to mix with this soot rich zone and reducing the propensity to generate soot during combustion. Such charge jets cause the ratio of the surface area of the oxidation zone ($O_{SA}$) to the volume of the soot rich zone ($S_V$) (the $O_{SA}:S_V$ ratio) to increase by interfering with the soot rich zone. Therefore, the amount of particulates expelled into the exhaust system is reduced.

The embodiments discussed below provide a combustion chamber partially defined by a piston oscillating between top dead center and bottom dead center within a cylinder when the engine is in operation. During operation, an intake charge is drawn into the combustion. chamber through an intake valve during the intake stroke. This same charge is then compressed during the compression stroke. An ignition environment is then established within the combustion chamber at or near the completion of the compression stroke. As noted above, in all embodiments an ignition environment that may include pilot or hot surface induced ignition wherein, as is often the case with gaseous-fuelled diesel-stroke engines, the environment created with the intake charge alone, that is, the temperature and/or pressure of that charge, is not sufficient to result in ignition of the fuel. As such, the ignition environment may be supplemented, for example, by ignition of a small amount of relatively easily auto-ignitable fuel or by the placement of a glow plug in the combustion chamber. Such ignition assists, along with the intake charge, are encompassed in the discussion of an ignition environment within the combustion chamber. In any event, the embodiments suppose the fuel in question is ignited after it is directly injected into the combustion chamber.

All embodiments consider engines using both directly injected gaseous and directly injected diesel or other liquid fuels.

Figure 2A:
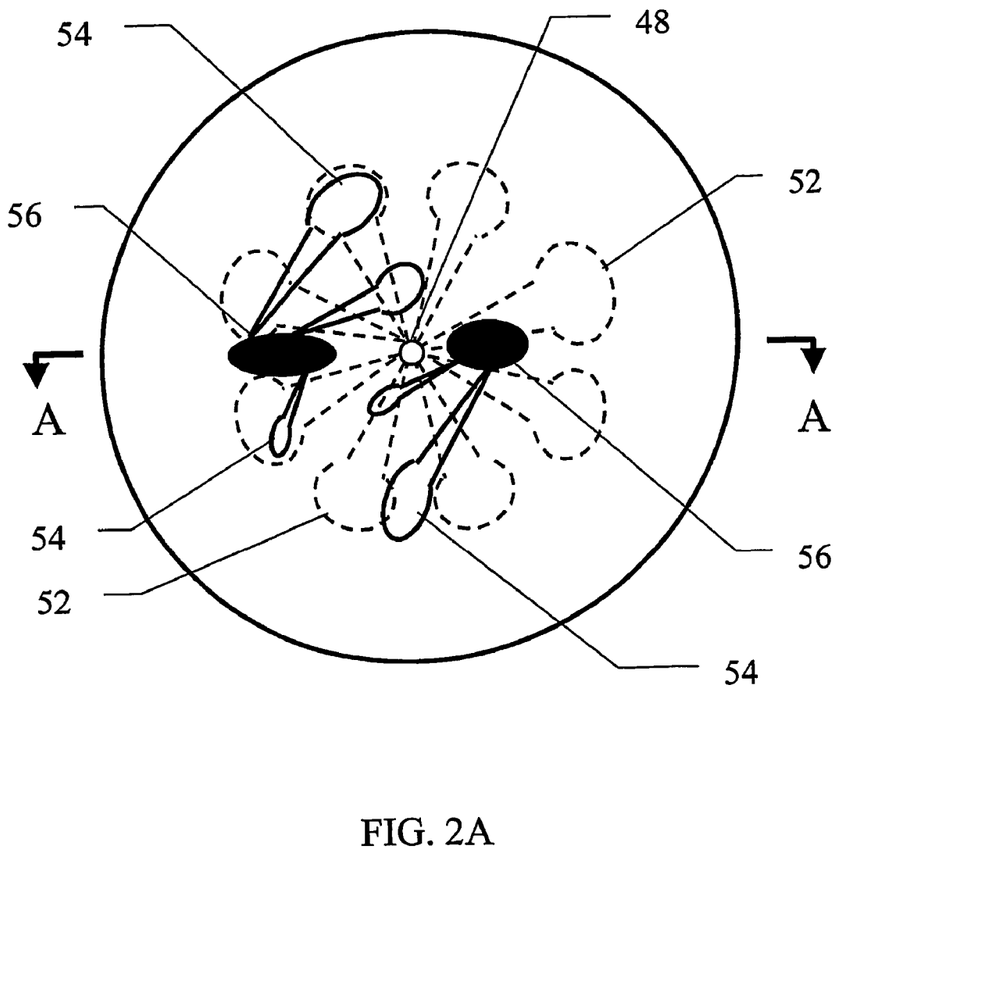
FIG. 2a shows a top view of this embodiment of the subject invention where charge reservoirs are defined within the fire deck.
Figure 2B:
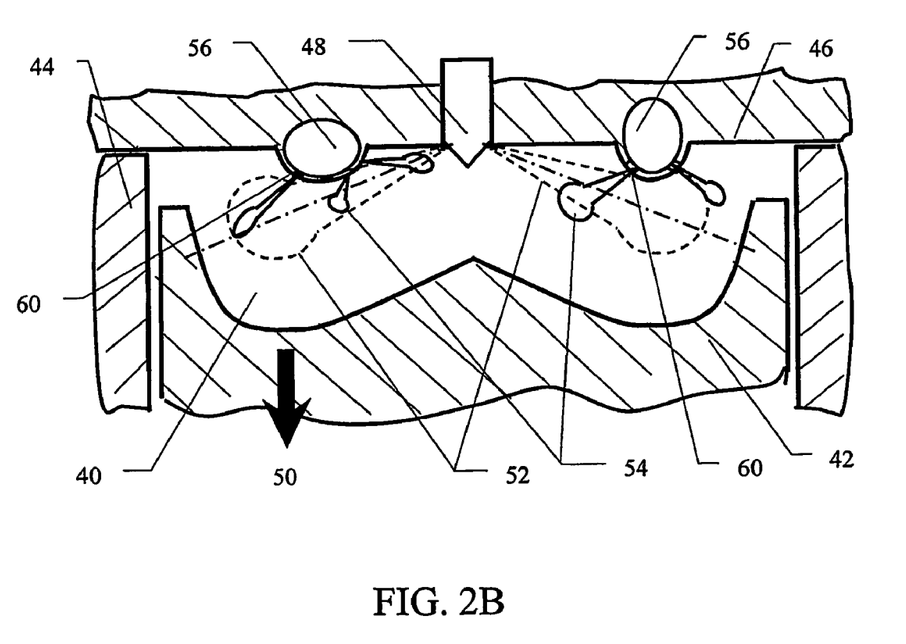

Referring to FIG. 2, combustion chamber 40 is substantially defined by piston 42, cylinder wall 44 and fire deck 46. A fuel injector for directly injecting a quantity of fuel into the combustion chamber is also shown with injector tip 48. In the figure, piston 42 is moving in direction 50 away from fire deck 46. Fuel jets 52 and charge jet 54 are outlined. Charge reservoirs 56 are also provided where charge reservoirs 56 are surrounded by reservoir walls into which are positioned orifices 60 allowing communication of charge between reservoirs 56 and chamber 40. The location of reservoirs 56 should be such that they avoid interference with intake and exhaust valve movements as shown in FIG. 2a.

In FIG. 2, an intake charge has been compressed within the combustion chamber, some of which has been forced into reservoirs 56 through orifices 60. At or near the commencement of the power stroke, when the piston is at or near top dead center, fuel 52 is provided into combustion chamber 40. For the purposes of this application, the piston would be considered near top dead center if it is within 30 degrees of top dead center as measured in degrees of crankshaft rotation.

The fuel, once ignited, drives the power stroke wherein the piston is forced in direction 50 away from fire deck 46. This movement of the piston away from fire deck 46 causes a rapid pressure gradient between reservoirs 56 and combustion chamber 40 as a result of the restrictive size of orifices 60, which retards equalization of pressure between these two spaces. The reservoir pressure is not able to match the pressure changes in the combustion chamber. The difference in the volume of the combustion chamber and the reservoir helps to establish a pressure gradient very quickly after commencement of ignition of the fuel.

Once the pressure gradient has been established between reservoir 56 and combustion chamber 40, the charge within reservoirs 56 is forced out of orifices 60 resulting in charge jets 54. Charge jets 54 are directed by orifices 60 to intersect fuel jets 52. The turbulence generated by the interaction of these jets tends to break up the soot rich zones, within the ignited fuel jet. The $O_{SA}:S_V$ ratio is increased and the tendency for creating particulates is reduced.

Preferentially, the timing of the injection of the fuel should precede the creation of the charge jet within the combustion chamber. That is, the effect of the charge jet is realized where charge jet 54 interacts with fuel jet 52 when the volume of the soot rich zone has accumulated.

Note that while a few orifices 60 are shown in FIG. 2 leading from each of reservoirs 56, one or a plurality of orifices may be used. When a plurality of orifices are employed each orifice can be oriented to interfere with the soot rich zone of the fuel jets.

Preferentially, at least one charge jet should be directed to interfere with the soot rich zone of each one of fuel jets 52. While only two reservoirs 56 are shown in FIG. 2, it is possible to utilize multiple reservoirs and multiple charge jets. Generally, in direct injection internal combustion engines, multiple fuel jets are injected throughout the combustion chamber. Therefore, multiple reservoirs and multiple charge jets can be used to interfere with each soot rich zone of each fuel jet.

Also, interactions between charge jets 54 and fuel jets 52 are not restricted to direct interference between the charge jet and the fuel jets. A charge jet can be aimed within the chamber to utilize the geometry of the chamber cause turbulence within combustion chamber 40 that would not otherwise be present without such charge jets. The result should provide reduction of the $O_{SA}:S_V$ ratio.

Figure 3A:
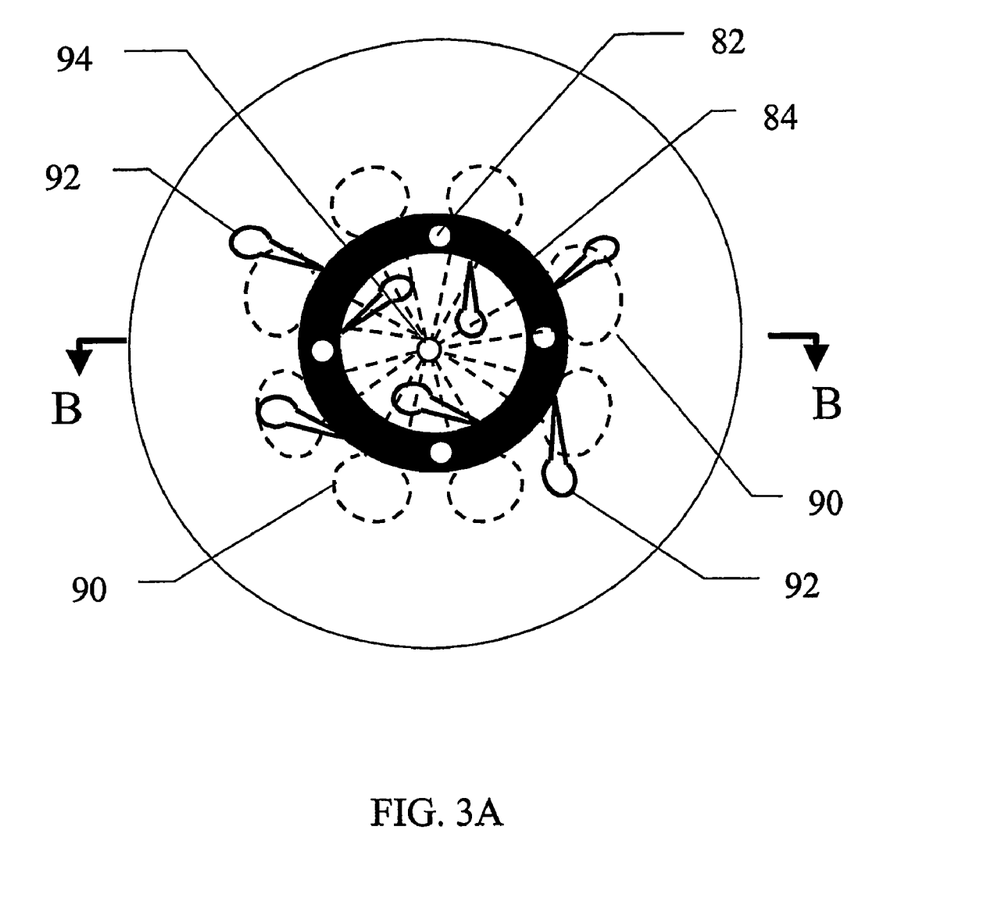
FIG. 3a shows a top view of this embodiment of the subject invention where a ring structure containing a charge reservoir is suspended within the combustion chamber from the fire deck.
Figure 3B:
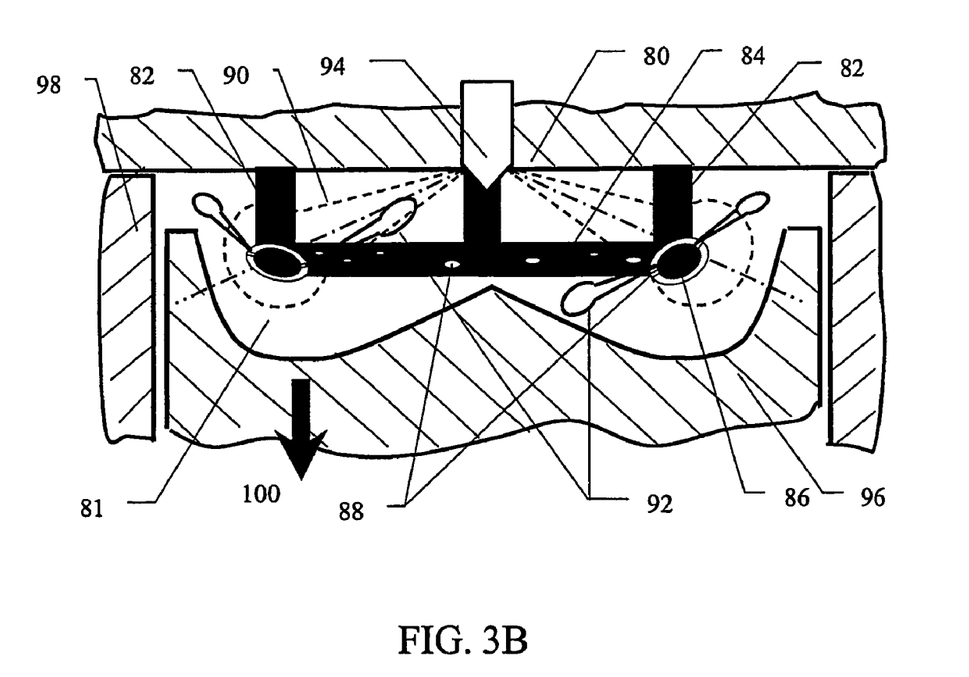

Referring to FIG. 3, a second embodiment of the subject invention is provided. Projecting from fire deck 80 into combustion chamber 81 are posts 82 from which is attached ring 84. Ring 84 is hollow, providing ring reservoir 86. Ring reservoir 86 is in communication with combustion chamber 81 through ring orifices 88. Shown outlined in dashed lines are fuel jets 90 and charge jets 92. Fuel jet 90 is shown entering combustion chamber 81 through injector tip 94. Combustion chamber 81 is further defined by piston 96 and cylinder wall 98. Piston 96 is moving in direction 100.

As with the first embodiment, FIG. 3 shows combustion chamber 81 when the piston is at or near top dead center upon commencement of the power stroke. An intake charge has been drawn into the combustion chamber during the intake stroke of piston 96. The charge has then been compressed within the combustion chamber during the compression stroke. At the same time, a volume of charge has been forced into reservoir 86 through orifices 88.

At the commencement of the power stroke, piston 96 is moving in direction 100 away from fire deck 80. The fuel is directly injected through tip 94 when the piston is at or near top dead center. Combustion of the fuel drives the piston downward. The volume within combustion chamber 81 increases quickly. As orifices 84 are relatively narrow, a pressure gradient is set up between reservoir 86 and combustion chamber 81. This pressure gradient causes charge accumulated within reservoir 86 during the compression stroke to be forced from this reservoir through orifices 88 creating charge jets 92. Charge jets 92 are directed at fuel jets 90 to generate interference within the soot rich zone. Therefore, the $O_{SA}:S_V$ ratio is increased.

The preferred arrangement of this second embodiment has multiple orifices 88 directing multiple charge jets 92 into the soot rich zone and ring 84 is preferably placed in the path of fuel jet 90 as shown in FIG. 3. Therefore, charge jets 92 are injected out of the soot rich zone. Charge jets 92 are generally at their maximum velocity upon exit from reservoir 86. The exit is preferably positioned so that charge jet 92 is introduced quickly into and out of the soot rich zone. The interference is generated by the impact of the charge jet at a high speed.

As an additional benefit, the ring itself, acts as an obstruction within the combustion chamber, interfering with fuel jet 90, generating additional interference in the soot-rich zone.

The embodiment in FIG. 3 shows multiple orifices 88 distributed throughout ring 84. As the reservoir is distributed in a ring around injector tip 94, where that injector, in most cases, provides a series of fuel jets throughout the combustion chamber, the ring structure provides an opportunity to create multiple charge jets form one reservoir that interfere with each fuel jet. That is, reservoir 86 and corresponding orifice 88 may be disposed within the path of each fuel jet 90.

In general, as would be understood by a person skilled in the art, positioning of the ring in this embodiment is preferentially centered on injector tip allowing each charge jet 92 to approximately equally influenced each fuel jet 90 in the case where fuel jets 90 are dispelled under similar conditions from the injector tip.

The properties of the orifices and reservoir can be varied to help provide interference between the charge jets and the soot rich zone within the fuel jets. By way of example, the number, orientation, dimensions and finish of the orifices as well as the orientation, placement, number and volume of the reservoir can be altered to help optimize this interference.

A variation of this second embodiment includes a reservoir ring mounted to the piston. That is, the embodiments are similar except that reservoir 86 is suspended above piston 96 by posts affixed to the piston. Here, to help establish interference or turbulence in the combustion chamber, it is preferential to work with a control strategy that introduces the fuel when the piston is at or near top dead center. The advantage of the ring structure attached to the piston is that the ring, as noted for the ring structure attached to the fire deck, is able to use the same reservoir, or reservoir housing (that is, the ring), to impact on all fuel jets distributed throughout the cylinder.

Further, posts 82 may also be used to define a reservoir connected to reservoir 86 or independent of reservoir 86 with one or more orifices directing a pressurized charge from the post reservoirs'.

By way of example only, the relative dimensions of the embodiment of the ring reservoir 86 provided in FIG. 3 may be determined by:

$$D=(0.45-0.95)*B$$

$$d=(0.35-0.85)*B$$

$$h=(0.02-0.2)*B$$

where D is the outer diameter of the ring and d the inner diameter of the ring, h is height of the supporting posts, and B is the diameter of the cylinder. This is where the ring is positioned to obstruct the soot rich zone of fuel charge 90. The volume of such rings is preferably between approximately 10% to 20% of the cylinder volume at top dead center. The diameter of orifices may be 0.5 mm to 2 mm. The reservoir volume and diameter of the orifices may fall in a similar range for the first embodiment discussed above.

Further, as this embodiment provides a physical obstruction in the path of the fuel jets, the obstruction may further enhance turbulence in turn increasing the $O_{SA}:S_V$ ratio.

As would be understood by a person skilled in the art, care should taken to ensure that a ring be clear of intake valves and exhaust valves leading into the combustion chamber allowing these valves to open as required during operation of the engine.

Figure 4A:
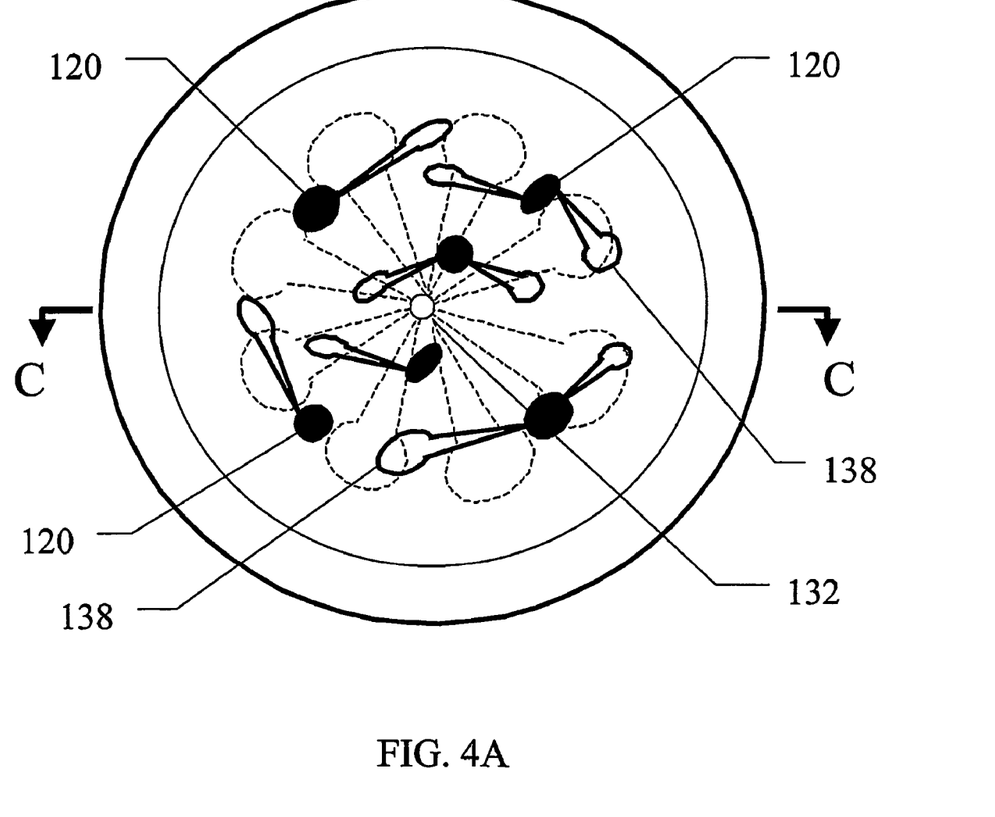
FIG. 4a shows a top view of this embodiment of the subject invention where a series of posts containing a charge reservoir are suspended within the combustion chamber from the fire deck.
Figure 4B:
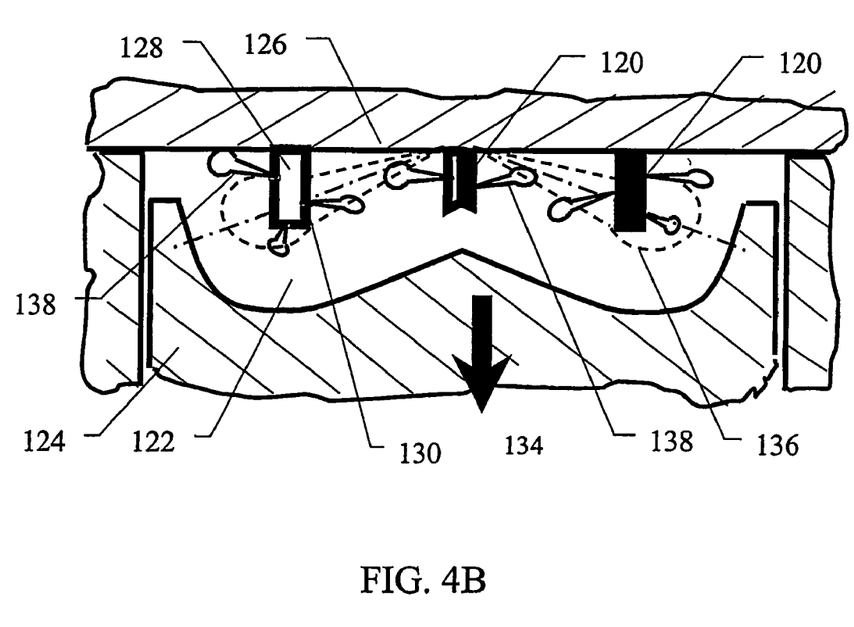

Referring to FIG. 4, a third embodiment is provided. Here posts 120 are. distributed throughout combustion chamber 122. Combustion chamber 122 is defined, in part, by piston 124 and fire deck 126. Post reservoirs 128 are found in each of posts 120 along with one or more orifices 130 that will allow charge within combustion chamber 122 to communicate with post reservoirs 128. Injector tip 132 is also shown. Piston 124 is moving in direction 134. Fuel jets 136 and charge jets 138 are outlined.

This embodiment provides reservoirs 128 projecting into combustion chamber 122 housed in a post rather than a ring structure. As with the second and first embodiments, a charge volume is accumulated within reservoirs 128 during the compression stroke of piston 124. Orifices 130 are sized to allow for a pressure differential to build during the commencement of the power stroke causing pressurized ejection of the accumulated charge resulting in charge-jet 138 ejected from reservoir 128 to create localized turbulence.

As with the ring structure, posts 120 are positioned to help provide localized turbulence so as to disrupt the soot rich zone.

Also, by placing the posts within the fuel jet path as a physical obstruction, additional turbulence can be created by such obstruction.

Posts 120 may be positioned throughout the combustion chamber, including attachment to the piston as well as the fire deck. As with the two previous embodiments, variables such as orifice parameters, reservoir volume as well as positioning of the posts can be used to better provide turbulence within the combustion chamber sufficient to break up the soot rich zone within the fuel jet.

Figure 5:
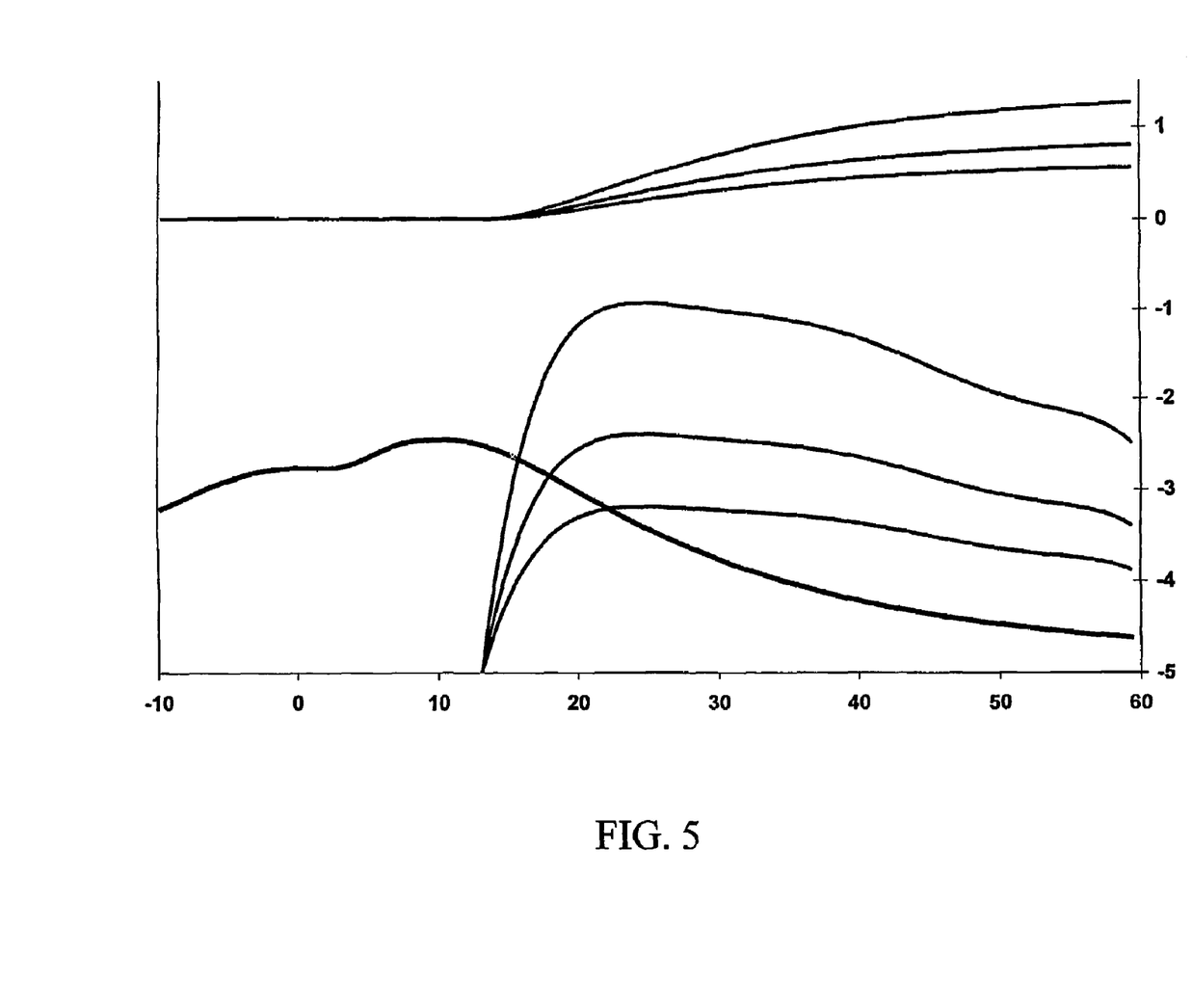
FIG. 5 is a graph demonstrating the cylinder pressure, charge jet velocity and ratio of charge jet momentum to fuel jet momentum against crank angle measured in degrees of rotation.

Referring to FIG. 5, a graph is provided that shows an example of the impact of the subject invention on a fuel jet within a combustion chamber. The combustion chamber pressure line 200 is shown when the piston is near top dead center through to 60 degree beyond top dead center. Also, charge jet velocity lines 202 are provided as a measure of the velocity of the charge jet from a reservoir over the same period in the engine cycle. Line 206 indicates velocity lines for decreasing orifice diameters. Momentum ratio lines 204 are also shown as a measure of the momentum of the charge jet to the total fuel momentum where the fuel is a gaseous fuel. Line 208 indicates decreasing orifice diameters. The graph provided is for typical engine parameters.

Referring to FIG. 5, the charge jet velocity, line 202, is at a maximum near 30 degrees past top dead center for the example cases provided. The momentum ratio 204 shows the total momentum of the air exiting from the cavity approaches the total momentum injected into the chamber by one gaseous fuel jet where 1 (see right y-axis) indicates equal momentum. As the soot rich zone is more prevalent towards the end combustion of the fuel, the impact on the fuel jet is most significant, considering this example, at or near 30 degrees beyond top dead center.

An advantage of the charge jets is that it supplements the cylinder motion and turbulence towards the end of the combustion period rather than, as in the case of squish, for example, only during the latter stage of the compression stroke. That is, swirl and squish-type turbulence found in many compression ignition engines may be extended where charge jets are provided. The velocity of the charge jets approaches a cycle maximum when the piston is several degrees beyond top dead center. As swirl and squish are at a maximum when the piston is near top dead center, the charge jets help to extend this turbulence locally beyond top dead center. Referring again to FIG. 5, the charge jets provide additional turbulence beyond 20 degrees after top dead center.

As would be recognized by a person skilled in the art, it is important that the ring, post or other such structures be positioned so as to not obstruct the intake and exhaust valves.

The reservoirs and the reservoir structures housing those reservoirs are not limited to the three embodiments disclosed above. Other structures for defining or housing a reservoir within the combustion chamber can be utilized. Preferentially, these should be positioned to allow interference with the fuel jets when the piston has moved to between 20 and 30 degrees beyond top dead center. This may restrict placement of the reservoir, therefore, on or attached to the piston. The fire deck and walls of the cylinder, however, may be appropriate under certain circumstances.

Also, a jet or charge jet could be generated independent of the compression stroke. That is, a charge jet could be pressurized and forced into the combustion chamber through an injector or other pressurized reservoir not created during the compression stroke. This may be used where multiple fuel jets are used or where a fuel jet is injected well after top dead center during the power stroke.

The present invention requires materials that can withstand high temperatures and stresses found within a combustion chamber. These materials are well known to persons skilled in the art as related to other internal combustion engine applications. For example, glow plug shield materials used in glow plug shields may be appropriate in regards to ring 84 and posts 120.

While the present invention is contemplated as it applies to a four-stroke engine, it is adaptable to a two-stroke engine as would be understood by a person skilled in the art.

The energy stored in the high temperature structure used to provide a reservoir in the case of embodiments that are placed in the path of or near the fuel jets, may also appreciably enhance the ignition of the fuel jets.

It would be appropriate to fasten the ring or posts or other structure defining a reservoir disposed in the combustion chamber using screws or welding or any other appropriate method, as would be understood by a person skilled in the art.

While particular elements, embodiments and applications of the present invention have been shown and described; it will be understood, of course, that the invention is not limited thereto since modifications may be made by those skilled in the art without departing from the scope of the present disclosure, particularly in light of the foregoing teachings.

What is claimed is:

1. A method of reducing soot produced during combustion of a fuel directly injected in a combustion chamber of an operating internal combustion engine, said method comprising:
   (a) introducing an intake charge into said combustion chamber during an intake stroke of a piston, said piston partially defining said combustion chamber;
   (b) compressing said intake charge during a compression stroke of said piston to yield a compressed intake charge having a composition;
   (c) receiving a quantity of said intake charge into a reservoir through an orifice during said compression stroke of said piston;
   (d) directly injecting a fuel jet of said fuel into said combustion chamber;
   (e) burning said fuel in said combustion chamber during a power stroke of said piston;
   (f) during the power stroke, allowing a pressure gradient established between the reservoir and the combustion chamber to propel a charge jet of the intake charge through the orifice into the combustion chamber, said charge jet generating turbulence within the combustion chamber beyond 15 degrees after top dead center, the charge jet having a composition substantially the same as the composition of the compressed intake charge.

2. The method of claim 1 wherein said reservoir is fixed relative to an injector and said fuel jet is directly injected into said combustion chamber through said injector.

3. The method of claim 1 wherein said charge jet is aimed at a soot rich zone within said fuel jet generated during burning of said fuel.

4. The method of claim 1 wherein said charge jet is directed into a soot rich zone.

5. The method of claim 1 wherein said charge jet is directed out of a soot rich zone.

6. The method of claim 1 wherein propelling said charge jet into said combustion chamber increases a ratio of a surface area of an oxidation zone of a jet of the fuel being burned to a volume of a soot rich zone of said burning fuel jet.

7. The method of claim 1 further comprising injecting said fuel into said combustion chamber when said piston is near top dead center.

8. The method of claim 1 wherein said reservoir is defined by a ring supported into said combustion chamber.

9. The method of claim 8 wherein said ring is supported in said combustion chamber from a fire deck, said fire deck partially defining said combustion chamber.

10. The method of claim 8 wherein said ring is supported in said combustion chamber by said piston.

11. The method of claim 1 wherein said reservoir is defined within a fire deck, said fire deck partially defining said combustion chamber.

12. The method of claim 1 wherein a ratio of said at least one reservoir volume to said combustion chamber volume, when said piston is at top dead center, is between 1:9 and 1:4.

13. The method of claim 10 further comprising injecting said fuel jet into said combustion chamber when said piston is near top dead center.

14. The method of claim 1 wherein said fuel is a gaseous fuel.

15. The method of claim 14 wherein said fuel is natural gas.

16. An internal combustion engine comprising:
    (a) a cylinder;
    (b) a piston disposed in said cylinder, said piston oscillating between top dead center and bottom dead center during operation of said engine;
    (c) a fire deck, said cylinder, said piston and said fire deck defining a combustion chamber;
    (d) a fuel injector capable of directly injecting a fuel jet of a fuel into said combustion chamber;
    (e) at least one reservoir for accumulating a quantity of intake charge during a compression stroke of said piston, said reservoir fixed in relation to the fuel injector;
wherein said reservoir is in fluid communication with said combustion chamber by way of at least one orifice, said at least one orifice having a cross-sectional area small enough to restrict flow of said quantity of said intake charge from said reservoir into said combustion chamber during the power stroke of said piston to generate turbulence within the combustion chamber beyond 15 degrees after top dead center.

17. The engine of claim 16 wherein said at least one reservoir is within a ring supported in said combustion chamber.

18. The engine of claim 17 wherein said ring is suspended from said fire deck.

19. The engine of claim 17 wherein said ring is centered around said injector.

20. The engine of claim 16 wherein said reservoir is within at least one post, said at least one post extending from said fire deck into said combustion chamber.

21. The engine of claim 16 wherein said reservoir is at least partially defined within said fire deck.

22. The engine of claim 16 wherein a ratio of said at least one reservoir volume to said combustion chamber volume, when said piston is at top dead center, is between 1:9 and 1:4.

23. The internal combustion engine of claim 16 wherein said fuel is a gaseous fuel.

24. The internal combustion engine of claim 23 wherein said fuel is natural gas.

25. The internal combustion engine of claim 24 further comprising a glow plug in said combustion chamber, said glow plug capable of igniting said natural gas.

26. The engine of claim 16 wherein the engine is configured to operate in a two-stroke cycle.

27. A method of reducing soot produced during combustion of a fuel directly injected in a combustion chamber of an operating internal combustion engine, the method comprising:
    (a) introducing an intake charge comprising oxygen into said combustion chamber during an intake stroke of a piston, said piston partially defining said combustion chamber;
    (b) compressing said intake charge during a compression stroke of said piston;
    (c) receiving a quantity of said intake charge into a reservoir through an orifice during the compression stroke of said piston;
    (d) directly injecting a fuel jet of said fuel into said combustion chamber;
    (e) burning said fuel in said combustion chamber during a power stroke of said piston;
    (f) during said power stroke, generating turbulence that interferes with said fuel jet by propelling a charge jet of said intake charge through said orifice into said combustion chamber from said reservoir using a pressure gradient established between said reservoir and said combustion chamber, said charge jet generating turbulence within said combustion chamber beyond 15 degrees after top dead center, wherein oxygen in said charge jet from said intake charge is substantially unreacted.

* * * * *